United States Patent [19]

Carr

[11] Patent Number: 5,678,087
[45] Date of Patent: Oct. 14, 1997

[54] CAMERA HAVING AN UPSTREAM READ ONLY MAGNETIC SENSOR TO DETECT EXPOSED IMAGE AREAS ON MAGNETICALLY COATED FILM

[75] Inventor: Thomas Daniel Carr, Leucadia, Calif.

[73] Assignee: Eastman Kodak Company, Rochester, N.Y.

[21] Appl. No.: 686,904

[22] Filed: Jul. 26, 1996

Related U.S. Application Data

[63] Continuation-in-part of Ser. No. 576,734, Dec. 21, 1995.

[51] Int. Cl.[6] ............................................. G03B 17/24
[52] U.S. Cl. ............................ 396/319; 396/390; 396/392
[58] Field of Search ....................................... 354/105, 106, 354/109, 207; 396/310, 319, 387, 389, 390, 392; 360/110, 113, 115

[56] References Cited

U.S. PATENT DOCUMENTS

| | | | |
|---|---|---|---|
| 4,291,351 | 9/1981 | Pennell et al. | 360/113 |
| 4,589,041 | 5/1986 | Voegeli | 360/113 |
| 4,965,626 | 10/1990 | Robison et al. | 354/106 X |
| 5,016,030 | 5/1991 | Dwyer et al. | 354/106 X |
| 5,229,810 | 7/1993 | Cloutier et al. | 354/106 X |
| 5,572,268 | 11/1996 | Tamamura | 396/319 |

Primary Examiner—Safet Metjahic
Assistant Examiner—J. K. Han
Attorney, Agent, or Firm—William F. Noval

[57] ABSTRACT

In a camera having an exposure film gate and device for advancing a film strip past the gate, the film strip having successive image areas with a magnetic track adjacent to each image area, wherein one or more of the image areas are exposed and have information magnetically recorded in the adjacent magnetic track of an exposed image area, the improvement comprising a thin film read only magnetic sensor located relative to the film gate so as to be upstream of the gate when the means advances the film strip past the gate, the sensor reading each the magnetic track adjacent to an image area to determine whether the image area has been exposed or not so as to detect an unexposed image area before it is advanced to the film gate.

4 Claims, 4 Drawing Sheets

CAMERA HAVING AN UPSTREAM READ ONLY MAGNETIC SENSOR TO DETECT EXPOSED IMAGE AREAS ON MAGNETICALLY COATED FILM

CROSS-REFERENCE TO RELATED APPLICATIONS

This is a continuation-in-part of application Ser. No. 08/576,734, filed 21 Dec. 1995, entitled "MAGNETICS-ON-FILM MID-ROLL INTERRUPT SYSTEM" by Thomas D. Carr.

FIELD OF THE INVENTION

This invention relates in general to magnetic recording and reproducing systems and more particularly to systems for recording and reproducing information on a magnetics-on-film (MOF) layer of photographic filmstrips.

BACKGROUND OF THE INVENTION

In commonly assigned U.S. Pat. Nos. 4,965,626 and 5,229,810, a photographic filmstrip having a virtually transparent, magnetic film layer on the non-emulsion side of the filmstrip (referred to as the MOF layer) is disclosed for use in camera systems. One or more longitudinal read/write tracks are provided in the MOF layer between the side edges of the image frame area and the filmstrip where information such as film type, film speed, film exposure information, and information relevant to the processing and subsequent use printing) of the exposed image frames may be prerecorded during manufacture of the filmstrip cartridge. The prerecorded information useful for controlling camera operations may be read out in a camera, and information related to the exposure of an image frame may be recorded in certain other tracks during camera use. The information recorded during camera use may include voice messages or sound associated with the photographed scene and may be recorded in digital or analog format. Both the prerecorded and the camera use recorded information can be read out for control and reprint purposes during photofinishing.

A feature of such advanced photographic systems is the ability to interrupt a roll of film in mid roll (referred to as Mid-Roll Interrupt) to allow a user to remove and insert partially exposed rolls of film from cameras without losing frames or getting double exposure. The feature uses a recorded magnetic signal to determine if a frame has been exposed or not. The camera or other device advances the film until it detects the first unexposed frame by the absence of recorded information. Present systems for Mid-Roll Interrupt, shown in FIG. 1, use a combined record/reproduce head 10 located downstream of the film gate area 12 to sense the signal.

The first available frame is positioned in the gate area 12 as follows: film 14 is thrust from the cartridge 16 in the direction of media travel 18, through the gate area 12, and past the head 10. The head 10 reads the magnetic track. Film 14 continues to be removed from the cartridge 16 until the first frame on which no signal is detected passes the reproduce head 10. The film 14 is then reversed and the unexposed frame is positioned at the gate area 12.

This method is expensive and unduly complicated and disadvantageous for the following reasons:

1. Because the sensor (head) is located downstream of the gate, the first available frame must pass the gate before being detected. The device must then reverse itself in a controlled manner to position the unexposed frame in the gate. This requires a more expensive gear train design than is used in cameras without this feature. In addition, the process will take longer with the version described.

2. The combined read/write head is large and expensive due to the large number of turns required to read the signal from the MOF film. The large size limits MRC application in compact cameras.

SUMMARY OF THE INVENTION

According to the present invention there is provided a solution to the problems of the prior art as set forth above.

According to a feature of the present invention there is provided in a camera having an exposure gate and a supply adjacent said gate for a film strip transported past said gate, said film strip having successive image areas with a magnetic track adjacent to each image area, the presence or absence of magnetic flux recorded on said track being indicative of whether the image frame has been exposed or not, the improvement comprising:

a magnetic sensor located between said gate and said supply to sense the presence or absence of magnetic flux recorded on a track adjacent an image area on said film strip to determine whether said image area has been exposed or not.

DESCRIPTION OF THE PREFERRED EMBODIMENTS

Figure 1:
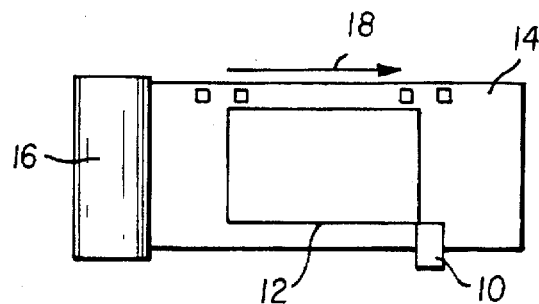
FIGS. 1-3 are diagrammatic views useful in describing the background of the present invention.
Figure 2:
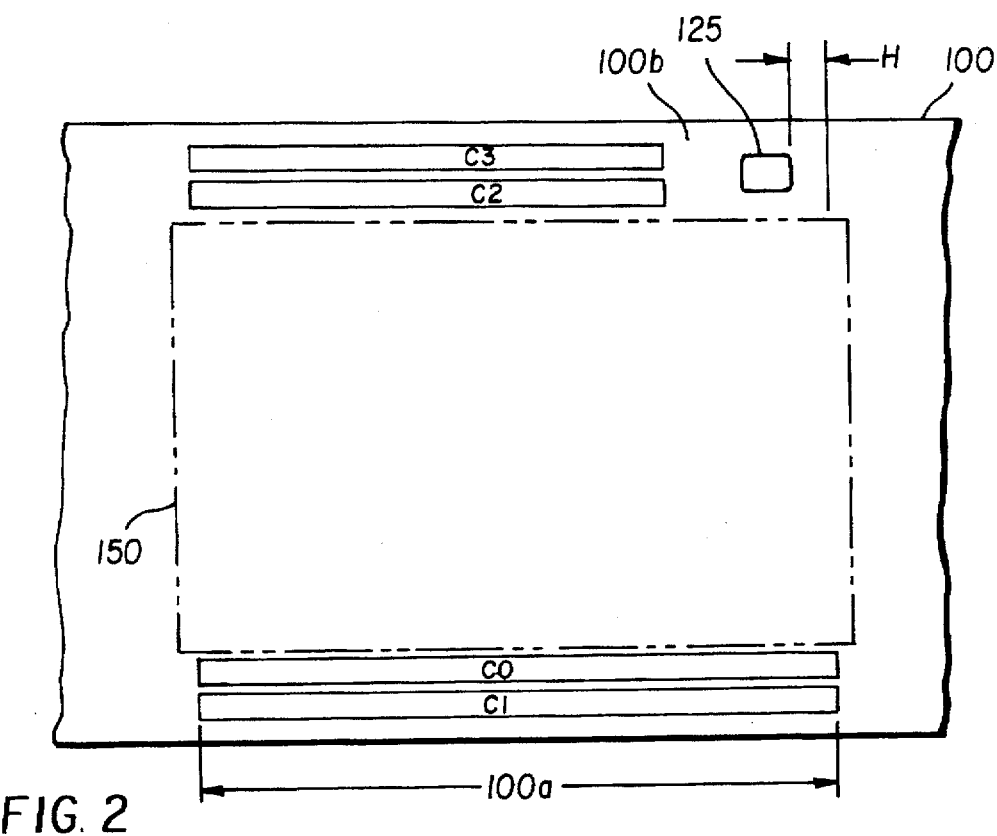
Figure 3:
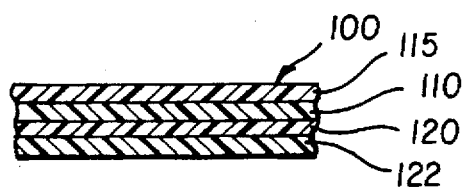

Referring to FIGS. 2 and 3, a strip 100 of color negative film includes a base 110, various well-known photochemical layers 115, on one side of the base 110, and a virtually transparent magnetic layer 120 on the other side of base 110. An anti-static and lubricating layer 122 covers the magnetic layer 120. The film strip 100 includes perforations 125 spaced along the film edge at regular intervals matching the pitch of a metering pawl in a camera adapted to use the film strip 100.

For purposes of recording data in the magnetic layer 120, each frame of the film strip 100 is divided into a plurality of predetermined parallel longitudinal track locations where magnetic tracks of data mat be recorded. Each of the tracks is preferably as shown in FIG. 2. In particular the two tracks along each edge of the film strip 100 are tracks C0, C1 and tracks C2, C3, respectively. Each one of the tracks is dedicated to the recording of a particular type of information by a camera having magnetic recording capability, in accordance with a prearrangement universally established for all cameras and photofinishing equipment utilizing the format. Perforations are excluded from the edge regions 100a and 100b adjacent each exposed image area 150 of a frame.

Figure 4:
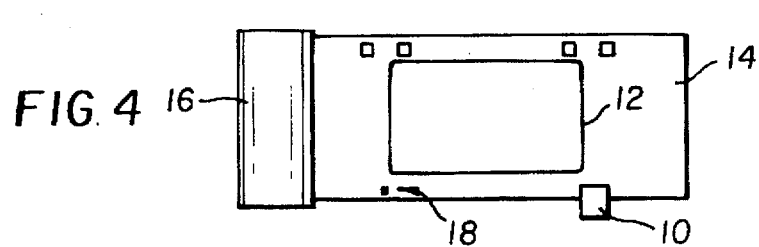
FIGS. 4 and 5 are respectively diagrammatic and side elevational views of apparatus incorporating one embodiment of the present invention.

Referring to FIG. 4, there is shown an embodiment of the present invention in which a thin film magnetic sensor 18 (such as a magnetoresistive sensor) is placed upstream of the film gate 12 to sense magnetic recording on the C1 track (FIG. 2). In the simplest camera system no expensive read head is required. The thin film sensor and associated signal electronics need only sense the presence or absence of recorded magnetic flux and need not be capable of interpretation of the recorded data. Because of the high signal output of the thin film sensor, the trackwidth could be made narrow enough that no precision alignment between the thin-film sensor and the track would be required. In addition, a very narrow sensor trackwidth relieves the need for precise azimuth alignment of the sensor. The width of sensor 18 can be substantially narrower than the width of track C1. Furthermore, the thin film sensor can be made very small. The large number of turns required by an inductive sensor makes it very thick (>8 mm), causing the camera thickness to increase, which is undesirable. The thin film sensor permits thin camera design.

With a separate sensor 18, mid-roll interrupt can be implemented on a one or two track system in a camera. Because sensor 18 is located before film gate 12, the first unexposed frame can be detected before it fully reaches the gate 12. This allows the first unexposed frame to be positioned in the film exposure gate 12, with no reverse motion of the film being required as when the sensor is located after the film gate. Thus, the use of a cheaper film drive mechanism is possible while reducing the time required to position the first unexposed frame in the gate.

Figure 5:
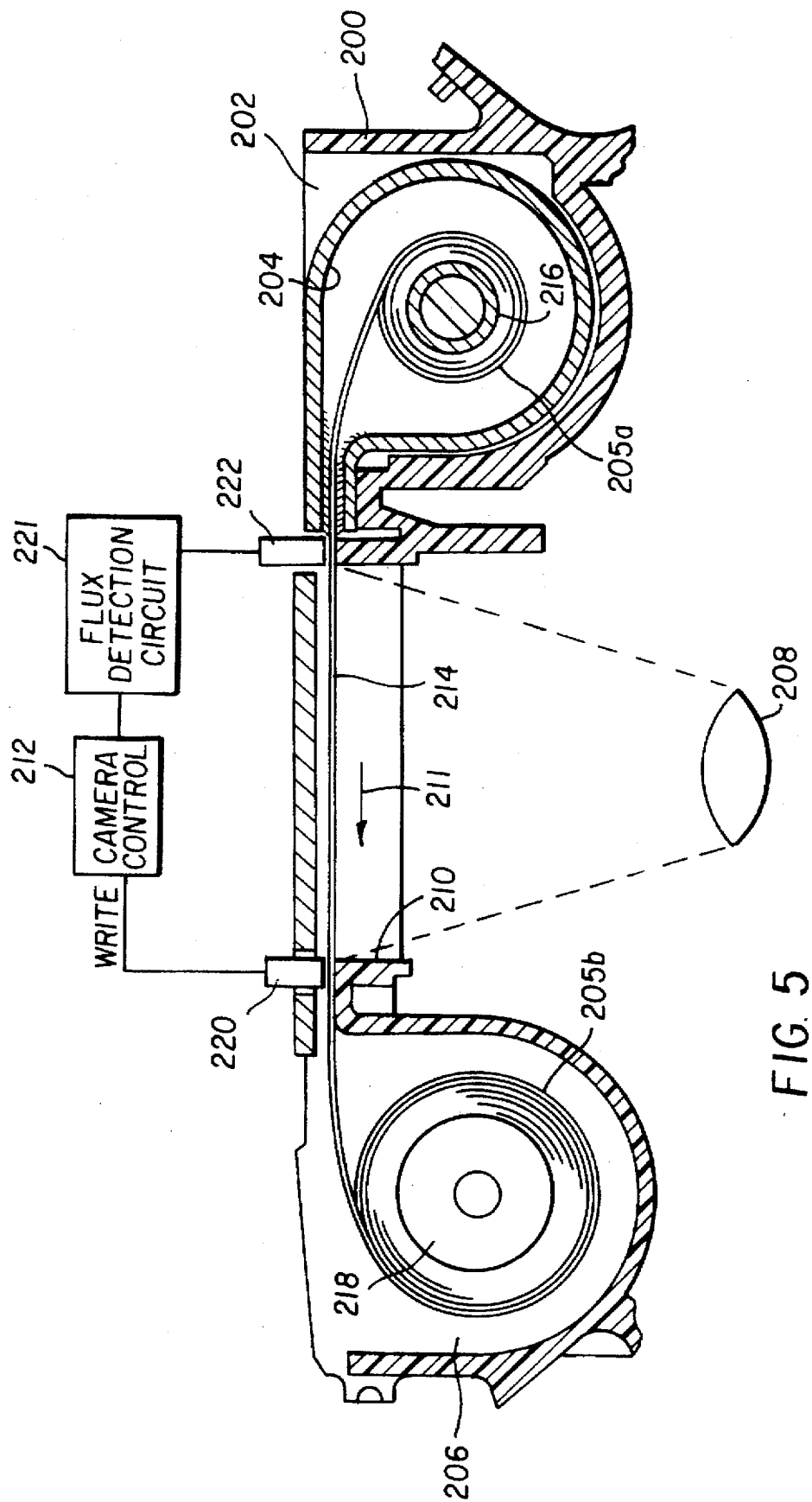

Referring now to FIG. 5, there is shown a camera incorporating the present invention. As shown, a camera 200 has a chamber 202 for receiving a film cartridge 204, a film takeup chamber 206, a lens 208, film exposure gate 210, and camera control 212. Cartridge 204 contains film 214 with a coil 205a wound on rotatable supply reel 216. Film 214 is transported in the direction of arrow 211 past exposure gate 210 into a coil 205b wound around rotatable takeup reel 218 in takeup chamber 206. A write magnetic transducer assembly 220 is positioned downstream of gate 210 to write data to and from the C tracks on film 214.

According to the invention, a thin film magnetic sensor 222 is located before gate 210 to detect the first unexposed frame before it is positioned in gate 210. Sensor 222 is coupled to camera control 212 by flux detection circuit 221. Sensor 222 can be a magnetoresistive sensor. The present invention allows the user to remove and insert partially exposed rolls of film from cameras without losing frames or getting double exposures. Sensor 222 is used to determine if a frame has been exposed or not. The film 214 is advanced out of cartridge 204 until the first unexposed frame is detected by the absence of recorded information. Since the unexposed frame is detected while it is being advanced into the exposure gate, there is no need to reverse the film, eliminating expensive film transport mechanisms and expediting the time when the film is ready to be exposed.

Figure 6:
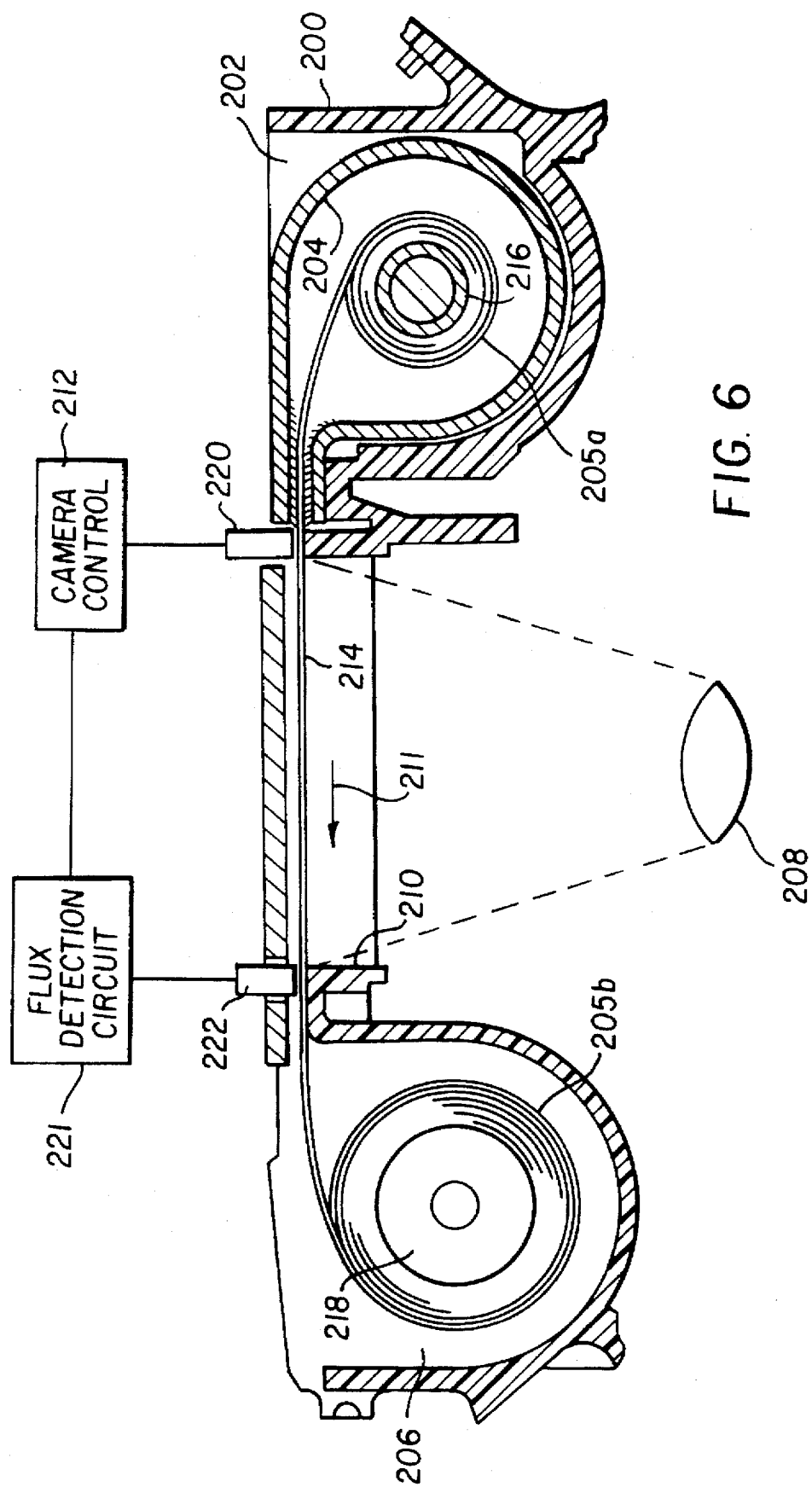
FIG. 6 is a side elevational view of apparatus incorporating another embodiment of the present invention.

In another embodiment of the present invention, as shown in FIG. 6, the camera is operated first in a prewind mode to continuously advance film 214 from cartridge 204 to film takeup chamber 206 without exposing any of the film frames at film exposure gate 210. The camera is then operated in a rewind mode to position respective frames of film 214 for exposure at gate 210 and to return them to cartridge 204 following each exposure. In this embodiment, write head 220 is positioned adjacent to cartridge 204 and sensor 222 is positioned adjacent takeup chamber 206. The operation is similar to the operation of the FIG. 5 apparatus.

It will be understood that although the invention has been described with a sensor sensing a narrow magnetic track that the invention is also applicable to a sensor 222 capable of sensing a wide track.

Figure 7:
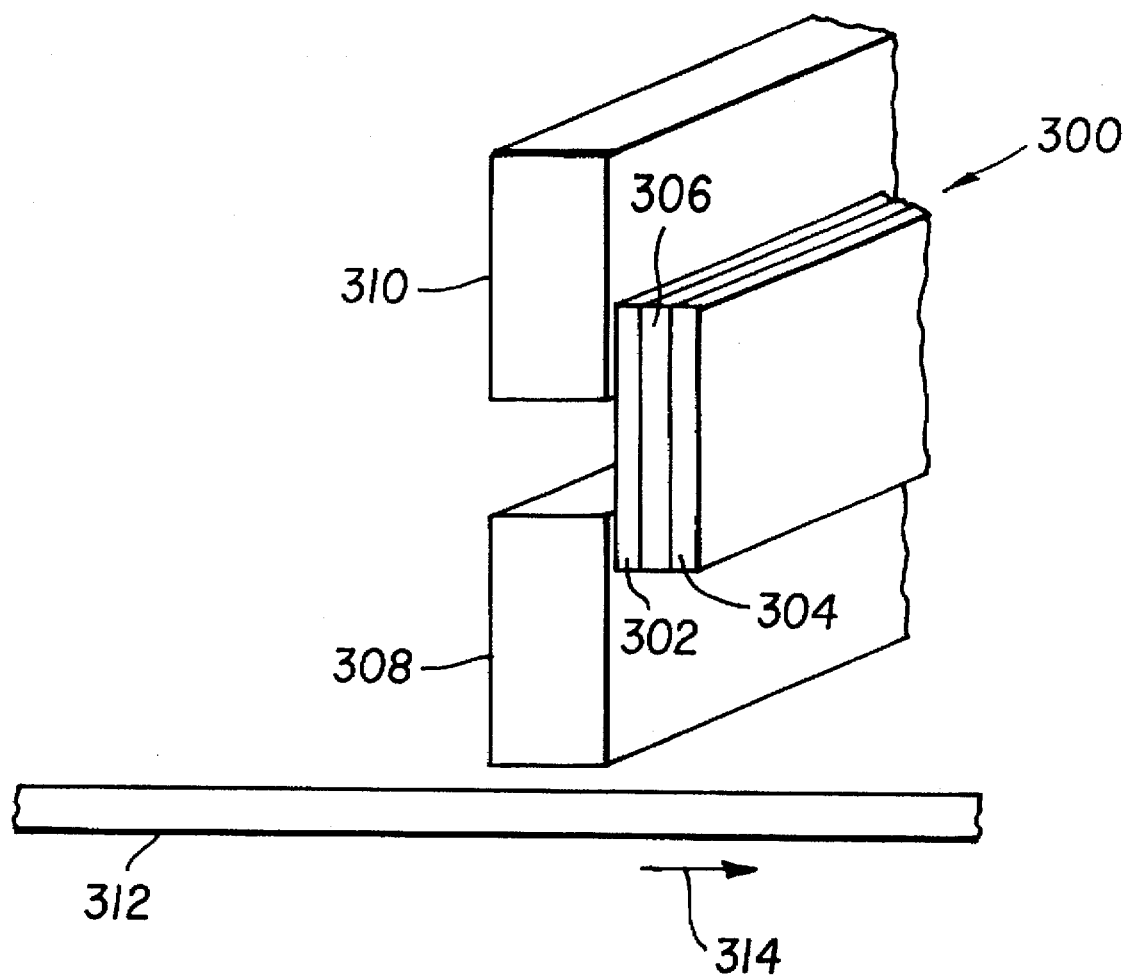
FIG. 7 is a perspective view of a flux guided PMR sensor which can be used in the present invention.

Sensor 222 is preferably a flux-guided paired magnetoresistive sensor, such as described in copending U.S. patent application Ser. No. 08/564,751, filed 29 Nov. 1995, entitled "Flux-Guided Paired Magnetoresistive Head", inventor N. Smith. FIG. 7 shows a diagrammatic view of such a sensor. As shown, sensor 300 includes paired magnetoresistive elements 302,304 separated by insulating spacer 306. High permeability magnetic flux guides 308,310 are spaced apart and overlap MR elements 302,304. Guide 308 is in contact with magnetic media 312 while MR elements 302,304 are spaced from media 312. Media 312 is moved past sensor 300 in the direction of arrow 314. MR elements 302,304 are preferably nickel ferrite. One end of each element is electrically shorted to the other element forming a three terminal device with one terminal common to both MR element s302,304. Sense currents flow in parallel through elements 302,304. By differentially sensing the voltage at the two unconnected terminals of the sensor, the individual voltage changes due to the signal field will add together. However, the changes due to fluctuations in the temperature of sensor 300 elements 302,304 will be canceled by differential detections.

Flux guides 308,310 direct magnetic flux from media 312 to sensor 300 which is spaced from media 312. Thus, sensor 300 is protected from wear and degradation resulting from direct contact with media 312. The life of the sensor is increased and possible electrical shorting of the MR elements is eliminated.

While the invention has been described in detail by specific reference to preferred embodiments thereof, it is understood that other variations and modifications may be made without departing from the spirit and scope of the invention.

What is claimed is:

1. In a camera having an exposure film gate and means for advancing a film strip past said gate, said film strip having successive image areas with a magnetic track adjacent to each image area, wherein one or more of said image areas are exposed and have information magnetically recorded in said adjacent magnetic track of an exposed image area, the improvement comprising:

a thin film read only magnetic sensor located relative to said film gate so as to be upstream of said gate and a magnetic head located downstream of said gate when said means advances said film strip past said gate, said sensor reading each said magnetic track adjacent to an image area to determine whether said image area has been exposed or not so as to detect an unexposed image area before said film strip is advanced to said film gate.

2. The improvement of claim 1 wherein said sensor is a magnetoresistive magnetic sensor.

3. The improvement of claim 1 wherein said sensor is a paired magnetoresistive sensor.

4. The improvement of claim 3 including a flux guide located contiguous to said sensor.

* * * * *